United States Patent
Takinosawa et al.

(10) Patent No.: US 7,197,583 B2
(45) Date of Patent: Mar. 27, 2007

(54) SDIO CONTROLLER

(75) Inventors: Jun Takinosawa, San Jose, CA (US); Hiroyuki Yasoshima, Hirakata (JP)

(73) Assignee: Zentek Technology Japan, Inc., Tokyo (JP)

( * ) Notice: Subject to any disclaimer, the term of this patent is extended or adjusted under 35 U.S.C. 154(b) by 291 days.

(21) Appl. No.: 10/757,405

(22) Filed: Jan. 15, 2004

(65) Prior Publication Data

US 2004/0205268 A1 Oct. 14, 2004

Related U.S. Application Data

(60) Provisional application No. 60/441,133, filed on Jan. 21, 2003.

(51) Int. Cl.
*G06F 13/12* (2006.01)
*G06F 13/38* (2006.01)
*G06F 13/00* (2006.01)

(52) U.S. Cl. .......................... 710/62; 710/72; 710/301

(58) Field of Classification Search .................. 710/2, 710/62, 72, 100, 300, 301, 305, 313
See application file for complete search history.

(56) References Cited

U.S. PATENT DOCUMENTS

| 6,748,482 B1* | 6/2004 | Fackenthal | 711/103 |
| 2001/0006902 A1* | 7/2001 | Ito | 455/558 |
| 2002/0065044 A1 | 5/2002 | Ito | |
| 2004/0225796 A1* | 11/2004 | Hanson et al. | 710/301 |

FOREIGN PATENT DOCUMENTS

JP 2002-171303 11/2000

* cited by examiner

*Primary Examiner*—Fritz Fleming
*Assistant Examiner*—David E. Martinez
(74) *Attorney, Agent, or Firm*—Griffin & Szipl, P.C.

(57) ABSTRACT

The present invention provides an SDIO controller, an SDIO wireless communication card, an SDIO wireless communications module, and a method for transmitting write data from an SDIO host device to an SDIO application. Specifically, the SDIO controller is a single-chip semiconductor device connecting an SDIO-compliant SDIO host device with a plurality of applications via an SD bus, wherein the controller includes: (a) an SD interface operably connectable with the SDIO host device to decode commands received from the SDIO host device, and to return a response to the SDIO host device; (b) one or more application interfaces; and (c) a temporary memory operably connected between the SD interface and the one or more application interfaces.

10 Claims, 4 Drawing Sheets

SDIO CONTROLLER

This application claims priority to U.S. Provisional Application No. 60/441,133, filed on Jan. 21, 2003, the entire disclosure of which is incorporated herein by reference in its entirety.

FIELD OF THE INVENTION

The present invention relates to the SDIO controller, which is a semiconductor device for connecting an SDIO host and SDIO card applications via an SD bus, compliant with the Secure Digital Input Output (abbreviated "SDIO") standard.

BACKGROUND OF THE INVENTION

There are a variety of standards for integrated circuit (IC) cards, which can be mounted on mobile devices such as notebook personal computers (PC), personal digital assistants (PDA), digital video devices, digital cameras, and portable audio devices. These mobile devices will be referred to collectively as "host devices". Recently, SD memory cards have been attracting attention because of their small size, high data transfer rates, and enhanced security features. For the purposes of this disclosure, the abbreviation "SD" stands for "secure digital" and various devices and their components related to this secure digital technology may be identified by the abbreviation "SD."

At present, there are two international standards for SD-related devices: (1) the SD memory standard for memory devices, and (2) the SDIO standard for input/output devices (I/O). The SDIO standard is an extension of the SD memory card standard and covers input/output functions as well as memory functions. Card-shaped peripherals compliant with the SDIO standard are referred to as "SDIO cards." An SDIO controller implements functions needed for peripherals to comply with the SDIO standard and connect to the host devices.

The "SDIO wireless communication card," which contains the SDIO controller equipped with a Universal Asynchronous Receiver Transmitter (UART) interface and wireless communication capabilities compliant with Bluetooth, is known as a conventional technology for SD-related devices such as described in JP 2002-171303 A2 to Ito Takafumi. The SDIO wireless communication card is capable of communicating data from a host device, wirelessly via SDIO, to distant Bluetooth-compatible wireless communication devices.

SDIO is a relatively new standard in wireless technology. In view of this fact, future research and development must be conducted in such a way as to meet the specifications of the SDIO international standard. Because SDIO is a newly emerging technology, environments for SDIO-related design and development are not yet in place. Specifically, certain necessary hardware devices for SD interfaces and associated software are not presently available. For example, a converter between Personal Computer Memory Card International Association (PCMCIA) and SD interfaces is required for the existing wireless local area network (LAN) module equipped with a PCMCIA interface when developing an SDIO card provided with wireless LAN capabilities that is capable of mounting on host devices equipped with an SDIO slot. In another example, when developing an SDIO card with large-capacity and non-volatile memory functions, the SDIO card must be equipped with a memory interface which supports various types of memory.

In view of the above problems associated with the prior art, an object of the present invention is to improve the design for an SDIO controller and to develop environments for SDIO-related devices. Another objective in accordance with the present invention is to provide a highly versatile SDIO controller equipped with capabilities to interface an SDIO host with various applications (i.e., wireless operation, global positioning system (GPS) functions, memory, etc.) and to provide other devices benefiting from application of the SDIO controller.

SUMMARY OF THE INVENTION

The present invention provides an SDIO controller having a single-chip semiconductor device connecting an SDIO-compliant SDIO host with a plurality of applications via an SD bus, comprising: an SD interface operably connectable to decipher commands received from the SDIO host and to return a necessary response to the SDIO host; one or more application interfaces; and a temporary Read/Write First-in, First-out (R/W FIFO) memory operationally disposed between the SD interface and the application interfaces.

The present invention makes it possible not only to select applications for use, but also minimizes the development costs and labor efforts related to engineering a card system fully compatible with the complicated SDIO standard. Preferably the application interfaces contain at least one of a PCMCIA interface, a PC card bus interface, a UART interface, or a memory interface. When these interfaces are provided, SDIO cards can be engineered by simply connecting them to the SD controller without modifying application modules with these interfaces. In particular, for example, when a PCMCIA interface is provided, an SDIO card compatible with the IEEE802.11b standard, one of the wireless communications standards, can be constructed by simply connecting the IEEE802.11b LAN module to the SDIO controller via the PCMCIA interface.

Similarly, when a UART interface is provided, a Bluetooth-compatible SDIO card can be constructed by connecting a Bluetooth module to the SDIO controller via the UART interface. Similarly, when a memory interface is provided, a memory device can be mounted to the memory interface, thereby adding the capabilities of the memory device to the input/output capabilities of SDIO. In such a case, the temporary memory preferably comprises as many read memories (RFIFO) as the application interfaces require, or at least one read memory to hold data temporarily before read out of SDIO applications; and at least one write memory (WFIFO) which temporarily holds data to be sent out to the SDIO host. The use of a plurality of read memories (i.e., RFIFO) makes it possible to manage data easily even if a plurality of applications are operated simultaneously, which simplifies and speeds up a control circuit that implements a suspend/resume capability stipulated by the SDIO standard. The temporary memory can be used to store not only the data transferred and received between the SD interface and application interfaces, but also the data transferred and received among the application interfaces. Furthermore, the SDIO controller constructed in accordance with the present invention preferably comprises a microcontroller unit ("MCU") for data control.

The use of the MCU makes it possible to help interpret SD commands received by the SD interface from a SDIO host device, to control any memory device connected to the memory interface, and to perform various processes such as running applications, transmission of interrupt signals, preparation of transfer data, and debugging. In this case, the SDIO controller may further comprise an I/O device (i.e., GPIO) to input and output control signals to/from the microcontroller unit (MCU).

Incidentally, a GPIO, HS-UART, PCMCIA, etc. used to connect to input/output devices are defined herein as function interfaces, and they are differentiated from memory interfaces used to connect to memories which store and maintain data. The function interfaces and memory interfaces are referred to collectively as "application interfaces."

The memory interfaces include an EEPROM, NAND-type flash memory, NOR-type flash memory, and other similar interfaces. The SDIO controller may comprise one or more of these interfaces or another type of memory interface. When equipped with a memory interface, the SDIO controller can be connected with a non-volatile memory (i.e., flash memory, ferroelectric memory, ferromagnetic memory, etc.) that is compatible with the memory interface. When connected with the non-volatile memory, the SDIO controller may comprise at least one of the following: firmware, hardware information about the SDIO controller (CIS), driver software (CSA), and user data in part of memory areas. Also, the SDIO controller may comprise hardware information about application modules (i.e., firmware, CIS, and CSA) in portions of the memory areas.

An SDIO wireless communications module may be configured such that the SDIO controller in accordance with the present invention will be connected with the wireless communication modules compliant with the communication standards, via the application interfaces. Examples of the communication standards include IEEE (Institute of Electrical and Electronic Engineers) 802.x, which, among others, may be IEEE802.11a/b/g/e. Thus, when the SDIO wireless communication module is put in the SDIO-compliant card, it becomes a wireless communication card. Alternatively, the SDIO wireless communications module may be provided as an integrated circuit chip so that it can be built into equipment that contains the SDIO host.

Thus, the SDIO controller, in accordance with the present invention, provides a useful tool for many developers who engineer SDIO drivers, wireless communication modules, or other hardware, not to mention SDIO cards.

The present invention provides an SDIO controller, an SDIO wireless communication card, an SDIO wireless communications module, and a method for transmitting write data from an SDIO host device to an SDIO application. More particularly, in a first apparatus embodiment in accordance with the present invention, an SDIO controller is provided, which is a single-chip semiconductor device connecting an SDIO-compliant SDIO host device with a plurality of applications via an SD bus, comprising: (a) an SD interface operably connectable with the SDIO host device to decode commands received from the SDIO host device, and to return a response to the SDIO host device; (b) one or more application interfaces; and (c) a temporary memory operably connected between the SD interface and the one or more application interfaces.

In a second apparatus embodiment in accordance with the present invention, the first apparatus embodiment is modified so that the SDIO controller further comprises a microcontroller unit for data control, wherein the microcontroller unit is operably connected to control the SD interface and the one or more application interfaces.

In a third apparatus embodiment in accordance with the present invention, an SDIO wireless communications card is provided that includes: (a) an SDIO controller comprising: (i) an SD interface operably connectable with the SDIO host device to decode commands received from the SDIO host device, and to return a response to the SDIO host device; (ii) one or more application interfaces; and (iii) a temporary memory operably connected between the SD interface and the one or more application interfaces; (b) a wireless communications module connected to the SDIO controller via the one application interface; and (c) an SDIO-compliant card enclosure, wherein the SDIO controller and the wireless communications module are disposed within the enclosure.

In a fourth apparatus embodiment in accordance with the present invention, an SDIO wireless communications module is provided that includes: (a) an SDIO controller comprising: (i) an SD interface operably connectable with the SDIO host device to decode commands received from the SDIO host device, and to return a response to the SDIO host device; (ii) one or more application interfaces; and (iii) a temporary memory operably connected between the SD interface and the one or more application interfaces; and (b) a wireless communications module operably connected to the SDIO controller via the one or more application interfaces; wherein the SDIO controller and the wireless communications module are integrated on a single circuit chip to form the SDIO wireless communications module.

In a first method embodiment in accordance with the present invention, a method of transmitting write data from an SDIO host device to an SDIO application is provided, wherein the method includes the steps of: (a) connecting an SDIO application with an SDIO host device, wherein the SDIO application comprises an SDIO controller having an SD interface and an application interface; (b) receiving a write command from the SDIO host device via the SD interface and interpreting the command; (c) generating a command response signal using the SD interface and sending the command response signal to the SDIO host device; (d) after the SDIO host device receives the command response signal, transmitting data from the host device to the SDIO controller via the SD interface, wherein the transmitted data includes at least a register read/write address, a selected type of operation, a quantity of data, and arbitrary write data; (e) decoding the transmitted data using a microcontroller unit of the SDIO controller; and (f) accessing non-contiguous register addresses of SD memory in the SDIO application via the application interface by using the microcontroller unit so data sent from the SDIO host device is written into the SD memory of the SDIO application.

The present invention provides a highly versatile SDIO controller equipped with capabilities to interface an SDIO host with various applications (i.e., wireless, GPS, memory, etc.) and to provide other devices resulting from application of the SDIO controller. Furthermore, the SDIO controller in accordance with the present invention enables coordinated development of I/O storage media devices and software. For example, the SDIO controller in accordance with the present invention can be utilized to readily provide a compact, low-power wireless communication card compatible with SDIO, or an SDIO-compatible wireless communication module that can be mounted on the host devices.

Further objects, features and advantages of the present invention will become apparent from the detailed Description of the Illustrative Embodiments, which follows, when considered together with the attached drawings.

DESCRIPTION OF REFERENCE NUMERALS

Figure 1:
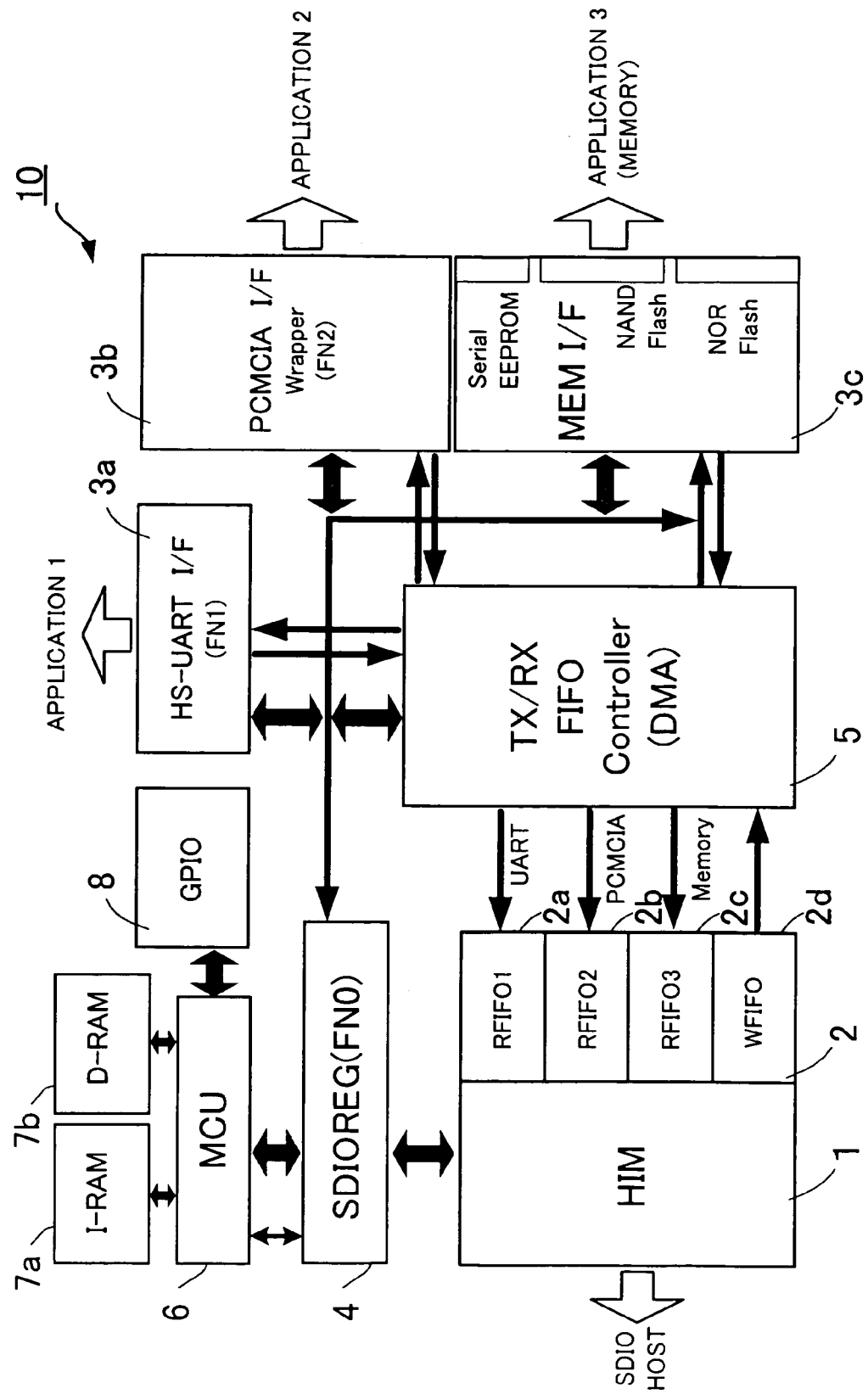
FIG. 1 is a schematic diagram showing the basic configuration of an SDIO controller in accordance with the present invention.

1 SDIO host interface module (abbreviated "HIM")
2 Temporary memory (i.e., R/W FIFO)
3a, 3b, 3c Application interface
4 Control register (SDIOREG)
5 FIFO controller (DMA)
6 Microcontroller unit (MCU)
7a I-RAM
7b D-RAM
8 GPIO
10 SDIO controller
11 Wireless communications card which can be inserted in a SDIO slot
15 Wireless communications module
20 Wireless LAN module
22 Medium access controller (MAC) and base band processor (BBP)
23 Radiofrequency (RF) controller
25 SDIO wireless card
26 SDIO wireless module
27 SDIO slot
28 SDIO card

DESCRIPTION OF THE ILLUSTRATIVE EMBODIMENTS

The basic, non-limiting illustrative configurations of the hardware in accordance with the present invention are described below with reference to the drawings, where like reference numerals are used to label like parts. FIG. 1 shows a basic configuration of the SDIO controller 10 in accordance with the present invention, wherein various components are represented by the functional blocks. The representative configuration will be described with reference to an example. All functions are implemented by an LSI chip (e.g., a PBGA approximately 6 mm×6 mm in size). An example of the SDIO controller 10 in accordance with the present invention comprises an I²C EEPROM, PCMCIA socket (slot), and UART connector.

As shown in FIG. 1, the SDIO controller 10 comprises an SD interface (HIM) 1 which deciphers commands received from an SDIO host device, and returns a necessary response to the SDIO host; a temporary (R/W FIFO) memory 2; and a plurality of application interfaces 3a, 3b, and 3c. A control register 4, (abbreviated "SDIOREG"), is included in the HIM 1. Although they are shown separately as distinct functional blocks, SDIOREG 4 is preferably integrated with HIM 1. The control register 4 is required the SDIO host device to control SD devices via the SDIO controller of the present invention.

The application interfaces may include a HS-UART interface 3a (i.e., a UART which supports higher speeds), a PCMCIA interface 3b, and a memory interface 3c to which a flash memory can be connected. Other application interfaces, such as those compatible with a PC card bus, or with other interfaces, may also be used without departing from the scope of the present invention.

The functional block components described so far form the minimum necessary components for constructing an SDIO controller 10 in accordance with the present invention. However, this core embodiment may be further modified to include a FIFO controller (i.e., DMA controller) 5, a microcontroller unit 6 (abbreviated "MCU"), I-RAM 7a, D-RAM 7b, and general peripheral I/O 8 (abbreviated "GPIO"). While only one DMA 5 is shown in FIG. 1, there are actually three DMAs incorporated in FIFO controller 5. Each DMA is connected to RFIFOs 2a, 2b, and 2c, respectively, which temporarily store data sent from the DMAs, and which correspond to the application interfaces. Each DMA is also connected to a WFIFO 2d, which temporarily stores data sent from the SDIO host via the HIM. The operational functions of these various SDIO controller components will be described below. To facilitate the understanding of this description, the SDIO controller 10 will be described as a component of an SDIO card 11 shown in FIG. 2. However, SDIO card 11 is only one embodiment in accordance with the present invention and is a non-limiting illustrative example.

The Interface Components (1) The SD Interface

The SD interface, or "HIM" 1, interprets SD commands received from the SD host via the SD bus and returns a necessary response according to the SDIO standard. In other words, the SD interface 1 receives a command sent by the SDIO host device, decodes this command, subsequently generates a response command signal, and then sends this response command signal back to the SDIO host device. Depending on the commands received, as those skilled in the art would recognize, the SD interface checks the data sent via the SD bus for CRC error, stores this checked data in the WFIFO of temporary memory 2, and reads pooled data out of the RFIFO of the temporary memory 2 and sends the pooled data with a CRC error check code to the SD host via the SD bus. The SD bus consists of nine signals. The functional and timing specifications of the SD bus are established by the SDIO standard. When an SDIO card (i.e., SDIO card 11) is inserted in the SDIO slot of an SDIO host device, the SDIO host operates to recognize certain card information and sends a large number of commands to identify and/or recognize the inserted SDIO card. The HIM 1 interprets the commands provided by the SDIO host device and returns a response to the host. After this exchange of data and once the SDIO card is authorized, data from the SDIO host device (e.g., image data from a digital camera, image data from an IP phone, etc.) can be received and transmitted between the SDIO host device and the SDIO card.

(2) The HS-UART Interface

A HS-UART 3a is a serial interface that is equipped with the temporary memory needed to support high-speed transfer. The HS-UART interface 3a takes parallel data out of the temporary memory 2, converts the parallel data into serial data, and transmits the serial data according to the RS-232C standard. On the other hand, the HS-UART interface also converts serial data received according to the RS-232C standard into parallel data, then stores the resulting parallel data in the temporary memory 2, and generates an interrupt signal sent to the SD host. The HS-UART interface allows a modem, a personal handyphone system (PHS), a Bluetooth device, or other device having the RS-232C interface to be connected to the SDIO controller 10. The SD host controls the HS-UART interface 3a and learns its status via SDREG (=SDIOREG) 4.

(3) The PCMCIA Interface

The PCMCIA 3b is an interface supported by notebook personal computers and the like. It is an international standard interface. Data is transferred between the temporary memory 2 and PCMCIA devices according to the international PCMCIA standard. Also, interrupts from PCMCIA devices are transmitted to the SD host via the SDREG (=SDIOREG) 4 and HIM 1. The PCMCIA interface 3b allows an IEEE802.11x standard device, hard disk, compact disk, or other device with a PCMCIA interface to be connected to the SDIO controller 10. Incidentally, COMPACT FLASHES™ and the like are basically a subset of the PCMCIA interface, and they are thus connectable to the PCMCIA interface 3b.

(4) Memory Interface

The memory interface 3c in accordance with the present invention includes three types of memory interfaces: (1) EEPROM, (2) NAND-type memory, and (3) NOR-type memory. It is desirable that a development tool, such as the SDIO controller in accordance with the present invention, should have as many memory interfaces as possible.

a. The I$^2$C Serial EEPROM Interface

The I$^2$C serial EEPROM interface takes parallel data out of the temporary memory 2, converts the parallel data into serial data, and then writes the serial data into a serial EEPROM according to the I$^2$C protocol, which is known to those skilled in the art. On the other hand, the I$^2$C serial EEPROM interface reads out serial data from the serial EEPROM according to the I$^2$C protocol, converts the serial data into parallel data, and stores the parallel data in the temporary memory 2. Thus, the I$^2$C serial EEPROM interface allows the serial EEPROM to be connected to the SDIO controller 10.

b. The NAND-type Flash Interface

The NAND-type flash interface takes data out of the temporary memory 2 and writes it into a NAND-type flash memory via a data line. On the other hand, the NAND-type flash interface reads out data from the NAND-type flash memory via the data line and stores this data in the temporary memory 2. Also, the NAND-type flash interface generates read/write signals and address signals necessary for data reads and writes. The NAND-type flash interface allows the NAND-type flash memory to be connected to the SDIO controller 10.

c. The NOR-type Flash Interface

The NOR-type flash interface takes data out of the temporary memory 2 and writes it into a NOR-type flash memory via an IO line. On the other hand, the NOR-type flash interface reads data from the NOR-type flash memory via the IO line and stores this data in the temporary memory 2. Also, the NOR-type flash interface generates commands and addresses necessary for data reads and writes and sends them to the NOR-type flash memory via the IO line. The NOR-type flash interface allows the NOR-type flash memory to be connected to the SDIO controller 10.

The additional storage capabilities of memory cards can be added to an SDIO card using the memory interfaces described above.

(5) The GPIO ("General Peripheral I/O") Interface

The GPIO interface of GPIO 8 controls the direction and values of GPIO interface signals according to default values written by the SD host into the SDREG(=SDIOREG) 4, and sets the signal values in the SDREG(=SDIOREG) 4. A GPIO interface in the input direction is used to make an interrupt request (abbreviated "IRQ") to the SD host as well as to make a status notification of application devices, such as "Receive Ready" status for example. A GPIO interface in the output direction is used to control LEDs, to control power consumption of application devices, and to switch modes.

The GPIO 8 is a general-purpose interface component so that other external modules (e.g., a radio receiving module) connected to a GPIO port can be controlled from the host device. Those skilled in the art would realize that GPIO 8 can be constructed with two or more GPIO interfaces without departing from the scope of the present invention. For example, GPIO 8 could have one input GPIO interface and several output GPIO interfaces.

(6) The SDREG(=SDIOREG)

The SDREG(=SDIOREG) is the control register 4 for the SDIO controller 10. The SDREG(=SDIOREG) 4 includes (a) a register defined by the SDIO standard installed in the area of Function 0 and accessible from the SD host, and (b) a register for internal control. SDREG(=SDIOREG) 4 is also accessed from the MCU 6. A description will now be given to those additional registers that are defined by the SDIO standard as user-dependent, and the registers for internal control. Specifically, the FN1 register of the HS-UART interface 3a and the FN2 register of the PCMCIA interface 3b are registers defined by the SDIO standard. However, the SDIO controller 10 includes various other internal control registers, which are not necessarily defined by the SDIO standard.

The FN1 (HS-UART) Register:

The HS-UART interface 3a is equipped with a control register FN1 for controlling the operation of the HS-UART. This control register FN1 can be seen directly from the SDIO host devices. The SDIO host devices can access this control register directly via the SDIO interface. Serial communications are conducted by the UART based on settings of this control register. In other words, by accessing this HS-UART control register, the host devices can directly control data transmission and reception to/from various devices or applications.

The control register FN1 for the HS-UART interface 3a is installed in an area of Function 1 defined by the SDIO standard. The SD host transmits and receives data to/from the HS-UART devices via this control register defined by the SDIO standard. Specifically, for example, a register equivalent to the one mounted on the 16650 chip from National Semiconductor Corporation is suitable for use as the control register for the HS-UART interface 3a.

Other component registers used to construct the control register FN1 for the HS-UART include a read buffer register (abbreviated "RBR": serves to hold received data temporarily), a transmit holding register (abbreviated "THR": serves to hold transmit data temporarily), an interrupt enable register (abbreviated "IER": used for interrupt control), an interrupt identification register (abbreviated "IIR": indicates interrupt sources), a FIFO control register (abbreviated "REF": operates to control transmit/receive FIFOs), line control register (abbreviated "LCR": controls data lines), modem control register (abbreviated "MCR": controls a modem), line status register ("LSR": displays data line status), modem status register (abbreviated "MSR": displays modem control line status), scratch register (abbreviated "SCR": is a general-purpose register), divisor latch LS (abbreviated "DLL": operates to divide a transmit/receive line clock), divisor latch MS (abbreviated "DLM": operates to divide a transmit/receive modem clock), and hardware flow control (abbreviated "HFC": controls a modem line by hardware).

The FN2 (PCMCIA) Register:

A control register FN2 for the PCMCIA interface 3*b* is installed in an area of Function 2 defined 0 by the SDIO standard. The SD host transmits and receives data to/from PCMCIA devices via this register FN2. Specifically, component registers are installed to control data windows to PCMCIA attribute areas, to control data windows to memory areas, to control data windows to IO areas, to address offset values of the data windows, and to control timing of PCMCIA signals as well as to provide interrupt enable control.

In addition, internal control registers are installed to store command identifiers and command arguments received from the SD host device, to specify data size for data transfer, to indicate types of error occurring during command processing, and to indicate SD bus mode. Internal control registers are also installed so that the MCU can control the HIM, DMA, temporary memories, and application interfaces, and to check the status of these operating components.

(7) Temporary Memories (i.e., WFIFO, RFIFO1, RFIFO2, RFIFO3)

These temporary memories 2*a*, 2*b*, 2*c*, 2*d* temporarily hold data to be transferred between the SD interface and application interfaces, or among the application interfaces. Herein, to facilitate an easier understanding of the present invention, the memory which temporarily holds data to be output to application interfaces is defined as a "WFIFO" (i.e., a "write" FIFO), and the memory which temporarily holds data received from application interfaces is defined as a "RFIFO" (i.e., a "read" FIFO). When one or more WFIFOs are combined with one or more RFIFOs to construct the temporary memory of the SDIO controller 10, the resulting temporary memory may be referred to as a "R/W FIFO device."

One FIFO is enough in principle to provide sufficient temporary memory for the SDIO controller 10. However, one WFIFO and three RFIFOs are provided in accordance with the present invention, although the number of WFIFOs and RFIFOs can be modified without departing from the scope of the present invention.

The capacities of FIFO memories (i.e., RAMs) are as follows, for example:

RFIFO1 . . . 512 bytes (for UART);
RFIFO2 . . . 2 kB (for PCMCIA);
RFIFO3 . . . 2 kB (for memories); and
WFIFO . . . 2 kB.

When there are a plurality of application interfaces, providing a RFIFO for each application interface achieves the following benefit. Even if data transfer from a first application interface to the SD host is temporally suspended for whatever reason, data can still be transferred from a second application interface to the SD host using another RFIFO. Therefore, data transfer from the second application is not affected by the delay in data transfer from the first application. Furthermore, the transfer of data from the first application interface to its RFIFO can continue when ready without interference from data transferred from the second application. Thus, when the data transfer from the first application interface to the SD host is resumed, and because data has been accumulating in the RFIFO dedicated to the first application interface, the data transfer suspension does not have as much effect on the data transfer rate as would occur if all transferred data had to pass through a single RFIFO. Likewise, the data received from application interfaces are pooled in the respective dedicated RFIFOs so the same benefits are realized whether the data is being transmitted or received. In addition, because the correspondence between data transmission and application interfaces is explicit (i.e., 1-to-1), it is easier to control the data stream.

(8) Direct Memory Access (Abbreviated "DMA")

Direct memory access (DMA) 5 is a control logic hardware component. DMA 5 transfers data between temporary memories and application interfaces. The DMA is controlled by the HIM 1 or MCU 6. Only one DMA is shown in FIG. 1 for the sake of convenience; however, a DMA is actually provided for each application interface and simultaneously transfers data between the application interfaces and FIFOs.

(9) Microcontroller Unit (MCU)

The microcontroller unit (MCU) 6 is a logic integrated circuit. MCU 6 has the I-RAM 7*a* (i.e., 8 kB) and D-RAM (i.e., 256 kB) connected to it. The microcontroller unit 6 can control the GPIO, SDIOREG (FNO), and DMA components as well as memory devices connected to the memory interfaces (abbreviated "M-IFs"). An 8-bit MCU (such as 80C51) is acceptable for use in the SDIO controller 10 of the present invention. The 8-bit MCU 6 has an 8-bit port, which transmits direction signals (i.e., either input or output), interrupt signals, and performs wired-OR operations.

Since there are only a few types of I/O commands that the HIM 1 receives from the SDIO host, I/O-only processing may be handled by the HIM alone without the MCU 6. On the other hand, at least tens of commands are needed to control a flash memory mounted on a memory interface. In this case, the MCU 6 can be used to control both I/O and flash interfaces. In addition, the MCU 6 can control the memory devices, help interpret SD commands received by the SD protocol engine (i.e., the HIM) from the SDIO host device, and perform various processes with respect to the applications to include transmission of interrupt signals, preparation of transfer data, and debugging.

Examples of MCU Processing

The data transferred to SD memory is always contiguous, and so are writes to a register. However, when using an SDIO card, a lot of non-contiguous register writes and reads occur frequently. This non-contiguous data transfer occurs because the SDIO host must issue a command for each access to the SDIO controller 10 of an SDIO application due to the need to access non-contiguous register addresses. This requirement that the SDIO host device issue an access command for each read or write access lowers effective data transfer efficiency on an SD bus.

To increase data transfer efficiency, the present invention includes a method that involves arranging, in advance, a type of operation that facilitates decoding of data received from the SDIO host and that accesses non-contiguous registers via an application interface. More specifically, when sending write data to an SDIO controller, the SDIO host sends data in sets of register read/write addresses. The SDIO controller 10 must operate to receive the sets of write data in the case of a write and allow the MCU 6 of the SDIO controller 10 to decode the data received from the SDIO host and to access non-contiguous registers via an application interface. In other words, to enhance data transfer efficiency, it is the SDIO controller 10 that both (1) decodes the data received from the SDIO host and (2) accesses the non-contiguous registers because the SD bus of the SDIO host cannot efficiently access the non-contiguous registers. Concrete examples of the method of decoding and accessing by the SDIO controller in accordance with the present invention will be described below.

Using CMD53 commands stipulated by the SDIO standard, data such as those shown below are transferred to the SDIO controller of the present invention via the SD bus.

Examples of Data Transfer

The SDIO controller 10 in accordance with the present invention receives, via the SD bus of the SDIO host, the following data (in order): [number of sets][first address] [type of first operation][quantity of first data]([first write data])[second address][quantity of second data]([second write data]) . . . [n-th address][type of n-th operation] [quantity of n-th data]([n-th write data]).

Incidentally, the write data is necessary only during writing, (i.e., when data is transferred from the SDIO host to the SDIO controller), and is not necessary during a read operation, (i.e., when data is transferred from the SDIO controller to the SDIO host).

Possible "types of operation" to be performed by the SDIO controller include, for example, the following.

(1) A write operation to a specified address (i.e., to a Fixed Address);
(2) A read operation from a specified address (i.e., to a Fixed Address);
(3) A write operation to an address contiguous with a specified address (i.e., to an Increment Address);
(4) A read operation from an address contiguous with a specified address (i.e., to an Increment Address);
(5) An operation of calculating a disjunction of data read from an address contiguous with a specified address and write data, and overwriting the specified address with the result;
(6) An operation of calculating a conjunction of data read from an address contiguous with a specified address and write data, and overwriting the specified address with the result;
(7) A write operation to a specified address in units of two bytes (i.e., to a Fixed Address);
(8) A read operation from a specified address in units of two bytes (i.e., to a Fixed Address);
(9) A write operation to a specified address in units of four bytes (i.e., to a Fixed Address); or
(10) A read operation from a specified address in units of four bytes (i.e., to a Fixed Address).

When the SDIO controller 10 receives the above data from the SDIO host, the SD interface 1 returns a response to the SDIO host and passes the received data to the microcontroller unit (MCU) 6. It is easy for the microcontroller unit (MCU) 6, which is a logic IC, to decode received data, and to write into non-contiguous addresses or to read necessary data from them. This kind of data transfer does not involve a reduction in data transfer efficiency even though the register addresses to be accessed are non-contiguous.

An Illustrative Method Embodiment

Next, the method of operation of the SDIO controller, in the case of a write command from the SDIO host device, will be described.

Step 1: First, the SD host device sends a command. The command contains such information as to the type of command, the number of data items to be transferred, and the destination. Step 2: Second, the HIM 1 of the SDIO controller 10 interprets the command (i.e., decodes the command and generates a Command response signal), and then returns a Command response signal to the SD host and generates an internal Command interrupt to the MCU 6. Step 3: Third, in the case of a write command, data is transmitted by the SDIO host to the SDIO controller when the SDIO host receives the response (i.e., the Command response). Step 4: Fourth, the HIM 1 stores the data in the WFIFO 2d. In the meantime, the interrupted MCU 6 controls the DMA 5 and an application (e.g. application 1, a UART application; application 2, a PCMCIA application; or application 3, a memory application) interfaces according to the content of the host command, and waits for the data from the SD host to arrive. Step 5: Fifth, upon receiving the data from the SDIO host device, the HIM 1 returns a Data response signal to the SD host and generates an internal Data Ready interrupt signal to the MCU 6. Step 6: Sixth, upon receiving the Data Ready interrupt signal, the MCU 6 starts up the DMA 5. Step 7: Seventh, the DMA 5 is started, and the data pooled in the WFIFO 2d is transferred via the predetermined application interface (i.e., corresponding to one of interfaces 3a, 3b and 3c depending upon which application has interfaced in accordance with the host command).

Incidentally, the HIM 1 may start up the DMA 5 by controlling the DMA and application interface directly and bypassing the MCU 6.

First Illustrative Embodiment: SDIO controller equipped with a wireless communication module.

Conventional wireless communication modules have been defined by the IEEE (Institute of Electrical and Electronic Engineers) 802.x standard, where "x" further defines which IEEE standard is selected (e.g., when "x" is 11b, then the chosen standard is IEEE802.11b). For example, in the wireless LAN area, 802.11b modules are the mainstream at present and technology development is conducted aiming at IEEE802.11a/g/e standards, or new standards with enhanced communications speed and security. Thus, it is desirable that the SDIO controller of the present invention be constructed to be compatible with conventional technologies as well as emerging technologies.

Regarding wireless LAN cards compliant with standard IEEE802.11b, for example, a large number of products which are designed to connect to a PCMCIA bus are known at present. If one wants to use a wireless LAN card as a SD card, it is physically impossible to directly connect a 9-pin SDIO host with a 68-pin PCMCIA device.

However, protocol conversion from SDIO into PCMCIA can be carried out using the SDIO controller 10 in accordance with the present invention while satisfying SDIO specifications. The SDIO controller of the present invention permits a PCMCIA-compatible IEEE802.11b wireless front end to be connected directly to the PCMCIA interface of the SDIO card, such as card 11. Thus, an SDIO-compatible wireless LAN card in accordance with the present invention can be developed at low cost in a short period of time using existing component architectures and software without requiring modification.

Figure 2:
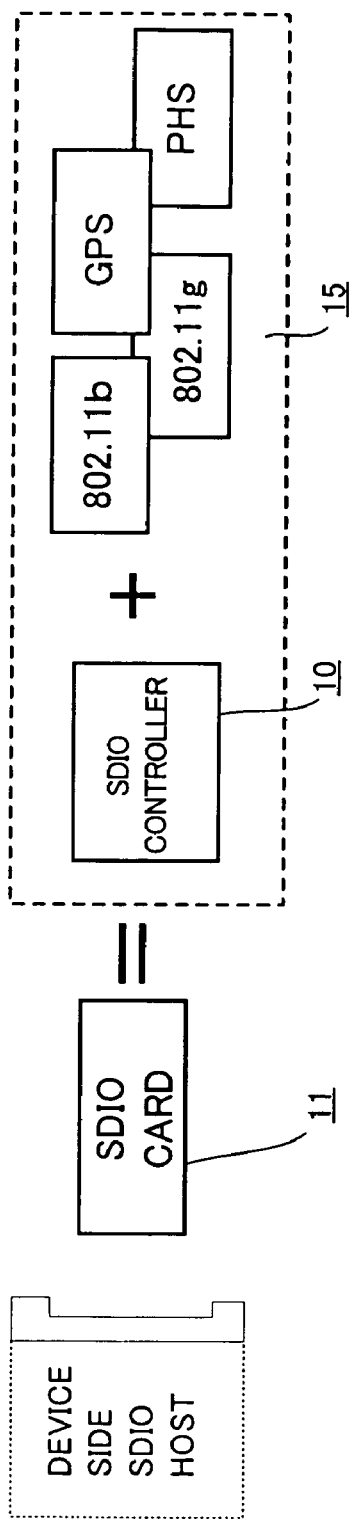
FIG. 2 is a schematic diagram showing a wireless communications card (i.e., a single SDIO card) that includes an SDIO controller 10 and a wireless communications module 15 connected via a PCMCIA interface and enclosed in a single card.

FIG. 2 schematically illustrates an embodiment in accordance with the present invention, which is an SDIO wireless LAN communication card 11. Specifically, by integrating the SDIO controller 10 and a wireless communication module 15, connected together via a PCMCIA interface in a single card, the present invention provides a wireless communication card 11 that can be inserted in SDIO slots of SDIO host devices. Preferably, a IEEE802.x, or other standardized wireless communication module, is used as the module 15. For example, the module 15 can be constructed to utilize one or both of IEEE standards 802.11b and 802.11g. In addition, the wireless communications module 15 can be constructed to include various applications such as a global positioning system (GPS) component and/or a personal handyphone system (PHS) component.

Figure 3:
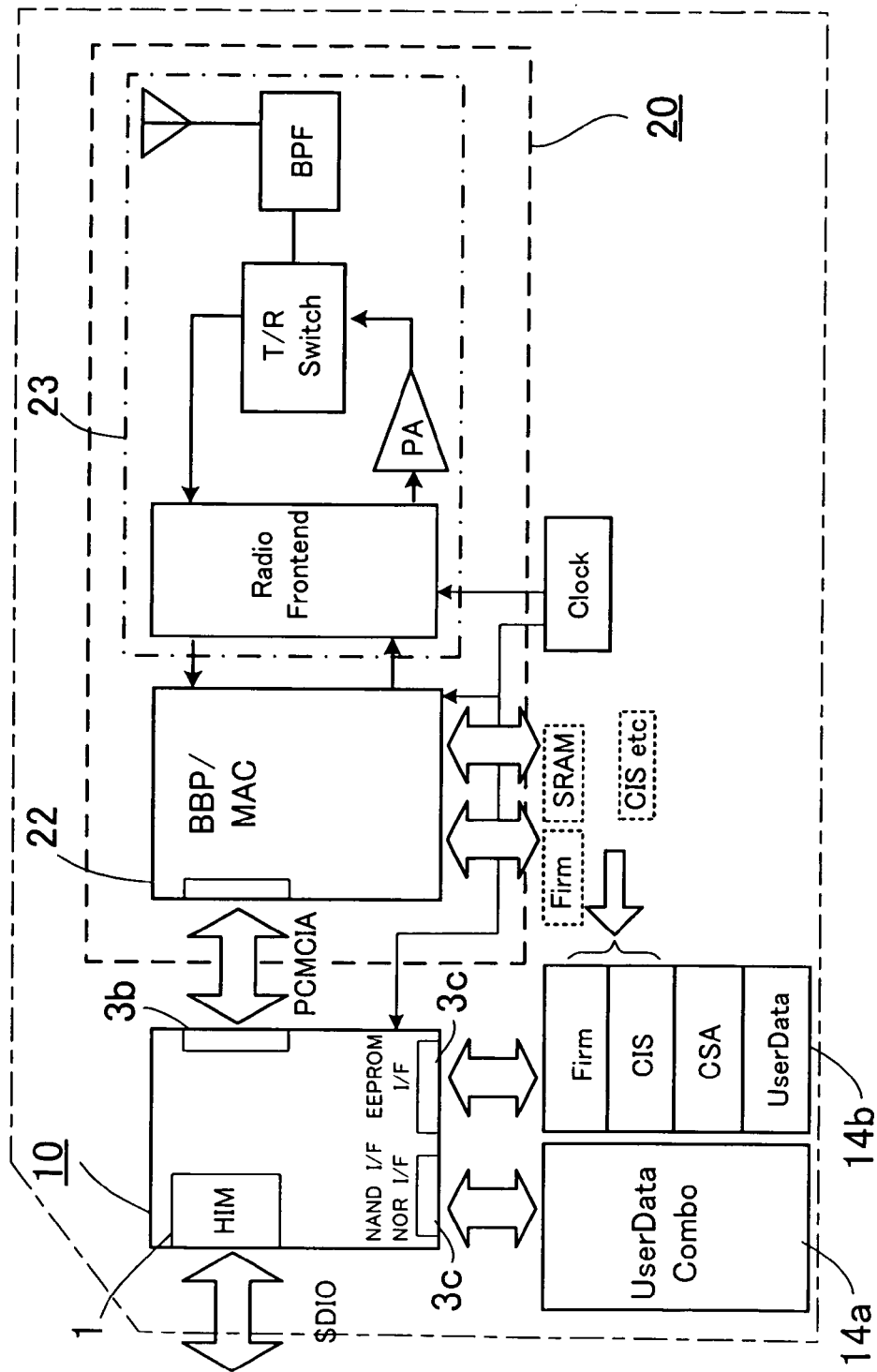
FIG. 3 is a schematic diagram showing an SDIO controller 10 and IEEE802.11b wireless LAN module 20 contained in a single SDIO card 11.

FIG. 3 schematically shows another SDIO wireless communications card, which includes an SDIO controller 10 and IEEE802.11b wireless LAN module 20 connected together and integrated in a single SDIO card. The broken lines indicate the IEEE802.11b standard wireless LAN module 20. The module 20 includes (1) a medium access controller (MAC) and a base band processor (BBP) integrated together to form component 22, and (2) a RF controller 23. The module 20 is connected to the SDIO controller 10 via a PCMCIA interface 3b.

The present invention also contemplates using a Bluetooth module as the wireless communications module in an SDIO wireless LAN communication card. In such a case, a Bluetooth module is connected to the SDIO controller in accordance with the present invention via a HS-UART interface, which is a standard Bluetooth port. Since the SDIO controller in accordance with the present invention can advantageously use existing application modules as SD applications, those skilled in the art would appreciate that the present invention can minimize the labor effort and other costs of design and development when applying SDIO technology to various host devices.

Furthermore, since the SDIO controller in accordance with the present invention is equipped with a plurality of application interfaces, when a plurality of wireless communication modules are installed, the SDIO controller allows selective use. For example, the user of a host device utilizing an SDIO wireless communication card in accordance with the present invention can connect to a wireless LAN when an access point is available and, in the alternative, use a PHS when no LAN access point is available.

In another embodiment in accordance with the present invention, the SDIO wireless communication card can be constructed to include a memory device as shown in FIG. 3. In this embodiment, the SDIO controller 10, the wireless communication module 29, and a memory device 14a, 14b are integrated and connected together to form the SDIO wireless LAN communication card. For example, a flash memory 14a and/or EEPROM 14b may be installed on a memory interface 3c of the SDIO controller 10 as shown in FIG. 3. This will add additional storage capabilities of a memory card to the wireless LAN card. Of course, the wireless LAN card in accordance with the present invention may be constructed only for wireless LAN capabilities, without the addition of memory card capabilities, in order to reduce costs. In this way, by adapting an interface of an existing wireless communication module to an application interface of the SDIO controller in accordance with the present invention, it is possible to develop applications utilizing the SDIO controller at low costs in a short period of time.

The Advantage of Adding Memory: the Commonality of Firmware

Installing a memory device together with an application other than a memory device, such as a wireless communication module, has the advantage of achieving commonality of firmware and the like. This advantage will be described below.

Normally, an application (such as a wireless communication module) is provided with memory for recording firmware and the like. When the SDIO controller is provided with a built-in memory device, firmware for the application and firmware for the SDIO controller, and the like, can be recorded in different portions of the same memory device. Beside firmware, other necessary information (i.e., CompuServe Information Service (CIS), Communication Streaming Architecture (CSA), and etc.) may be stored in the integrated memory device. In this case, the firmware of the SDIO controller, and the like, can be downloaded via a memory interface while the firmware of the application, and the like, are downloaded via a PCMCIA interface, or other interfaces. Preferably, these boot programs are stored in the firmware of the SDIO controller.

Second Illustrative Embodiment: a SDIO Wireless Communication Module

In the first illustrative embodiment, the SDIO controller was incorporated in an SDIO card that is dimensioned to mate with an SDIO slot of an SDIO host device as described above. In the second illustrative embodiment, the wireless card 25 is constructed as an SDIO wireless LAN communication module, dimensioned to be incorporated into the SDIO host device. The wireless card 25 itself incorporates a built-in wireless communication module such as described in the first illustrative embodiment, and of course, memory or other applications may be added as required. However, the module 25 is dimensioned to mate with an SDIO slot 27 provided by branching the SD bus of the host device as shown in FIG. 4A.

Presently, personal computers (PCs) with built-in wireless LAN capabilities are available. These PCs incorporate an IEEE802.11b wireless LAN module to be connected to a PCMCIA card bus. To build the presently available wireless communication LAN modules into smaller mobile devices (e.g., digital video device, digital camera, personal digital assistant (PDA), etc.) other than a PC, these small devices must contain a built-in PCMCIA controller. However, building a PCMCIA controller into a mobile device, such as a digital camera, to provide for wireless communication increases cost. On the other hand, digital cameras and other mobile devices, which support SDIO cards and therefore have SDIO card slots, essentially incorporate an SDIO host. To take advantage of this feature of small mobile SDIO host devices, the present invention includes an embodiment where the SDIO controller is integrated with wireless communication components on a single integrated circuit chip to form a wireless LAN communication module that can be incorporated into the small mobile SDIO host device.

Figure 4:
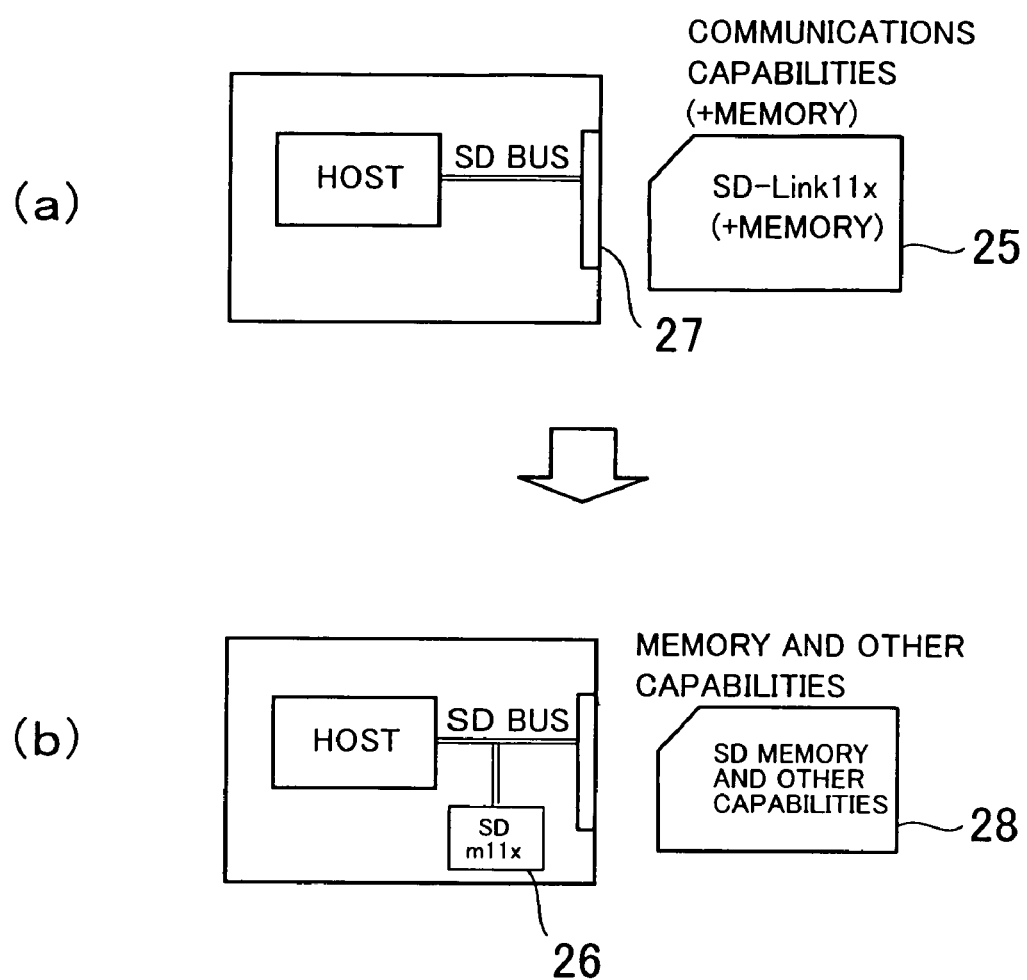
FIG. 4A is a schematic diagram showing a card 25 that contains a built-in wireless communications module.
FIG. 4B is a schematic diagram showing an SDIO controller and wireless communications module integrated on a single chip to form an SDIO modular component 26 incorporated into an SDIO host device.

Thus, as shown in FIG. 4B, by integrating the SDIO controller in accordance with the present invention and wireless communication capabilities on a single chip to form a module 26, and incorporating the resulting SDIO wireless LAN communication module 26 into a host device, it is possible to build the wireless communications capabilities into the host device without incorporating a PCMCIA controller. Furthermore, when an SDIO slot 27 is provided by branching the SD bus of the SDIO host device, an SDIO card 28 can be used to implement memory and other application capabilities. Thus, in the embodiment illustrated by FIG. 4B, the SDIO controller is integrated with the wireless communication components into a single chip module 26, which is then built-in to the SDIO host device. In this embodiment, the SDIO card 28 does not include the SDIO controller, but the card 28 is used to provide additional applications, such as additional memory and the like, which were not incorporated into chip module 26.

When constructing an SDIO card with both the memory and the wireless communication module incorporated in a single card, it is difficult to increase the memory capacity of the card. One solution to this memory capacity problem is to prepare a large-capacity memory-only card. However, such a solution requires either (a) to use both the memory card with the wireless communication capabilities and the large-capacity memory-only card together by interchanging them in the SDIO slot of the host device, or (b) to install two SDIO slots in the SD host device so that the two cards can be used simultaneously. However, these two solutions to the problem of limited memory are relatively clumsy and expensive. On the other hand, when a wireless communication module 26 in accordance with the present invention is built into the host device and the memory and other capabilities are incorporated into the SDIO card 28, a more elegant and cost effective solution to the memory problem is achieved. Clearly, the chip module 26 and SDIO card 28 of the present invention will be more convenient for both the user and manufacturer to use because there is no need to interchange cards in a single SDIO slot or to provide a second SDIO slot. Instead, the end user can purchase those desired optional peripherals for use via the SDIO slot while the necessary peripherals have already been selected and incorporated as part of the host device.

Incidentally, since the SDIO controller in accordance with the present invention has many application interfaces, when additional sockets, slots, or the like, compatible with these application interfaces are provided, a COMPACT FLASH™ and other memory devices can be used through the other interfaces of the SDIO controller, such as the PCMCIA interface.

Several other examples applying the SDIO controller in accordance with the present invention will also be described. By mounting a wireless communication module on the SDIO host, or inserting an SDIO card equipped with wireless communication capabilities, it is possible to use a wireless LAN in areas covered by access points, to communicate with other devices in an ad hoc fashion, or to implement a cordless telephone connection (i.e., an internet protocol (IP) phone) to the Internet.

When various applications (i.e., memories, PCMCIA card slots, UART sockets, etc.) and development software are installed with the SDIO controller of the present invention as either part of an SDIO control card or an SDIO control module, thereby preparing specifically engineered development environments, it becomes possible to provide certification services with respect to the internationally established SDIO standard.

While the present invention has been described with reference to certain illustrative embodiments, one of ordinary skill in the art will recognize that additions, deletions, substitutions, modifications and improvements can be made while remaining within the spirit and scope of the present invention as defined by the appended claims.

What is claimed is:

1. A Secure Digital Input Output controller having a single-chip semiconductor device connecting a Secure Digital Input Output-compliant Secure Digital Input Output host device with a plurality of applications via a Secure Digital bus, comprising:
    (a) a Secure Digital interface operably connectable with the Secure Digital Input Output host device to decode commands received from the Secure Digital Input Output host device, and to return a response to the Secure Digital Input Output host device;
    (b) application interfaces selected from the group consisting of a PCMCIA interface, a PC card bus interface, and a UART interface;
    (c) a temporary memory operably connected between the Secure Digital interface and application interfaces; and
    (d) a First-in, First-out controller comprising a direct memory access controller operably connected to transfer data between the temporary memory and the application interfaces.

2. A Secure Digital Input Output controller according to claim 1, wherein the temporary memory comprises a First-in, First-out device.

3. A Secure Digital Input Output controller according to claim 1, wherein the temporary memory in the Secure Digital Input Output controller comprises as many read memories as the number of application interfaces to temporarily hold data read out of Secure Digital Input Output applications; and at least one write memory operably connected to temporarily hold data to be sent out from the Secure Digital Input Output host.

4. A Secure Digital Input Output controller according to claim 3, wherein each read memory is a First-in, First-out device and the write memory is a First-in, First-out device.

5. A Secure Digital Input Output controller according to claim 1, wherein the temporary memory in the Secure Digital Input Output controller comprises at least one read First-in, First-out device operably connected to temporarily hold data read out of Secure Digital Input Output applications; and at least one write First-in, First-out device operably connected to temporarily hold data to be sent out from the Secure Digital Input Output host.

6. A Secure Digital Input Output controller according to claim 1, further comprising a microcontroller unit for data control, wherein the microcontroller unit is connected to control the Secure Digital interface and application interfaces.

7. A Secure Digital Input Output controller according to claim 6, further comprising an Input/Output device connected to input and output control signals to and from the microcontroller unit.

8. A Secure Digital Input Output controller according to claim 7, wherein the Input/Output device is a general peripheral Input/Output device.

9. A Secure Digital Input Output controller according to claim 8, wherein the microcontroller unit operates to decode data when the data sent from the Secure Digital Input Output host device to the Secure Digital Input Output controller via the Secure Digital bus contains at least a register read/write address, a selected type of operation, a quantity of data, and write data in a digital system, and the microcontroller unit operates to access non-contiguous registers via an application interface.

10. A Secure Digital Input Output controller according to claim 1, wherein the temporary memory comprises one First-in, First-out device for writing data and three First-in, First-out devices for reading data.

* * * * *